(12) United States Patent
Kim

(10) Patent No.: US 9,104,314 B2
(45) Date of Patent: Aug. 11, 2015

(54) METHOD AND APPARATUS FOR PERFORMING CALCULATIONS IN CHARACTER INPUT MODE OF ELECTRONIC DEVICE

(71) Applicant: Samsung Electronics Co., Ltd., Gyeonggi-do (KR)

(72) Inventor: Jeongseob Kim, Daegu (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 159 days.

(21) Appl. No.: 13/961,142

(22) Filed: Aug. 7, 2013

(65) Prior Publication Data

US 2014/0047373 A1    Feb. 13, 2014

(30) Foreign Application Priority Data

Aug. 8, 2012   (KR) .................. 10-2012-0086618

(51) Int. Cl.
  *G06F 3/048*    (2013.01)
  *G06F 3/0488*   (2013.01)
  *G06F 15/02*    (2006.01)

(52) U.S. Cl.
  CPC ............ *G06F 3/04886* (2013.01); *G06F 15/02* (2013.01); *G06F 3/0488* (2013.01)

(58) Field of Classification Search
  CPC ..................................................... G06F 3/0488
  USPC ......................................................... 715/773
  See application file for complete search history.

(56) References Cited

U.S. PATENT DOCUMENTS

| | | | | |
|---|---|---|---|---|
| 5,680,638 | A * | 10/1997 | Satoh | 715/204 |
| 6,742,162 | B2 * | 5/2004 | Bennett | 715/217 |
| 6,961,898 | B2 * | 11/2005 | Bennett | 715/212 |
| 2002/0143809 | A1 * | 10/2002 | Bennett | 707/503 |
| 2012/0209533 | A1 * | 8/2012 | Kodama et al. | 702/19 |

FOREIGN PATENT DOCUMENTS

KR   10-2012-0018848 A    3/2012

* cited by examiner

*Primary Examiner* — William Titcomb
(74) *Attorney, Agent, or Firm* — Cha & Reiter, LLC

(57) ABSTRACT

A method and apparatus for performing calculations in a character input mode of an electronic device. Character input is received in the character input mode, and input characters are displayed in a character input window. If determined that an arithmetic expression is present in the displayed input characters, the arithmetic expression is evaluated, and an evaluation result is displayed. A calculation enabling condition may be satisfied prior to, or after, the arithmetic expression identification. The method may be applied to character input modes of a text messaging or email application, or of a word processing application.

18 Claims, 11 Drawing Sheets

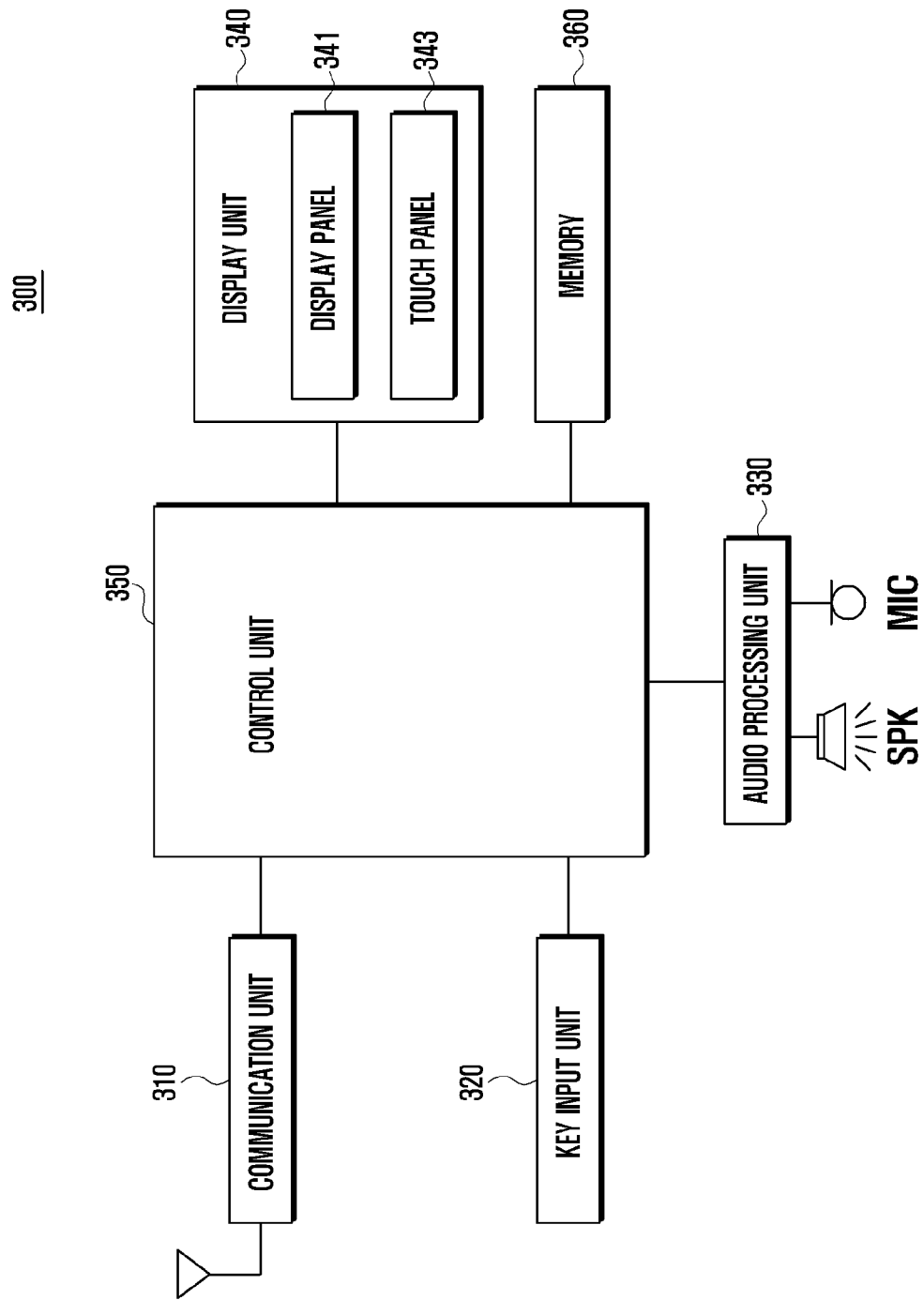

METHOD AND APPARATUS FOR PERFORMING CALCULATIONS IN CHARACTER INPUT MODE OF ELECTRONIC DEVICE

CLAIM OF PRIORITY

This application claims the benefit under 35 U.S.C. §119(a) of a Korean patent application filed on Aug. 8, 2012 in the Korean Intellectual Property Office and assigned Serial No. 10-2012-0086618, the entire disclosure of which is hereby incorporated by reference.

BACKGROUND

1. Technical Field

The present disclosure relates to an input method for an electronic device and, more particularly, to an input method in a character input mode of an electronic device, such as in a text messaging or word processing character input mode.

2. Description of the Related Art

Advances in information and communication technologies have vastly popularized consumer electronic devices such as desktop computers, laptop computers, smartphones and tablets. Users of electronic devices may share a variety of information by executing communication applications based on electronic mail, text messaging and instant messaging. A user of an electronic device may execute applications to write memos, keep household accounts, or perform calculations. In particular, to execute a communication application and a calculator application on an existing electronic device, the user typically uses separate windows or screens.

FIG. 1 illustrates an execution screen of a text message application supporting a character input mode according to a related art technique. FIG. 2 illustrates an execution screen of a calculator application according to a related art technique.

Referring to FIG. 1, in a state in which a message composition window is output on an electronic device display screen, when the user enters numeric keys and arithmetic operator keys of the touch keypad, the electronic device recognizes the numeric keys and arithmetic operator keys as ordinary characters. That is, when the user enters an arithmetic expression in a character input mode, the electronic device does not evaluate the arithmetic expression.

Referring to FIG. 2, when a calculator application is activated, the user may enter an arithmetic expression in the calculator application input window and the electronic device may evaluate the arithmetic expression. However, to share the evaluation result with another user, the user has to use another application supporting a character input mode other than the calculator application.

As described above, a user may be unable to execute a calculator application and an application supporting a character input mode at the same time. To share information needing calculations through a communication application such as a text message or email application, the user may have to repeat screen transitions to obtain an evaluation result using the calculator application and to manually enter or copy and paste the evaluation result in a character input mode of the communication application. A similar problem is apparent in a word processing application executed in the electronic device.

SUMMARY

The present technology has been made in view of the above problems, and provides a method and apparatus that evaluate an arithmetic expression entered in a character input window in a character input mode of an electronic device without requiring the user to use a separate calculator application or to enter a different operation mode.

In accordance with an exemplary embodiment of the present technology, a method for performing calculations in a character input mode of an electronic device is disclosed. Character input is received in the character input mode, and input characters are displayed in a character input window. If it is determined that an arithmetic expression is present in the displayed input characters, the arithmetic expression is evaluated, and an evaluation result is displayed. A calculation enabling condition may be satisfied prior to, or after, the arithmetic expression identification.

In embodiments, the method may be applied to character input modes of a text messaging or email application, or to a word processing application.

In accordance with another exemplary embodiment of the present technology, there is provided an apparatus for performing calculations in a character input mode of a electronic device, including: a display unit displaying input characters in a character input window; and a control unit determining whether a preset calculation enabling condition is satisfied, checking whether an arithmetic expression is present in the displayed input characters, evaluating the arithmetic expression, and controlling the display unit to display the evaluation result.

BRIEF DESCRIPTION OF THE DRAWINGS

The features and advantages of the present technology will be more apparent from the following detailed description in conjunction with the accompanying drawings, in which:

FIG. 3 is a block diagram of a electronic device according to an embodiment of the present technology;

DETAILED DESCRIPTION

Figure 1:
FIG. 1 illustrates a character input mode execution screen in a text message application of an electronic device according to a related art technique.
Figure 2:
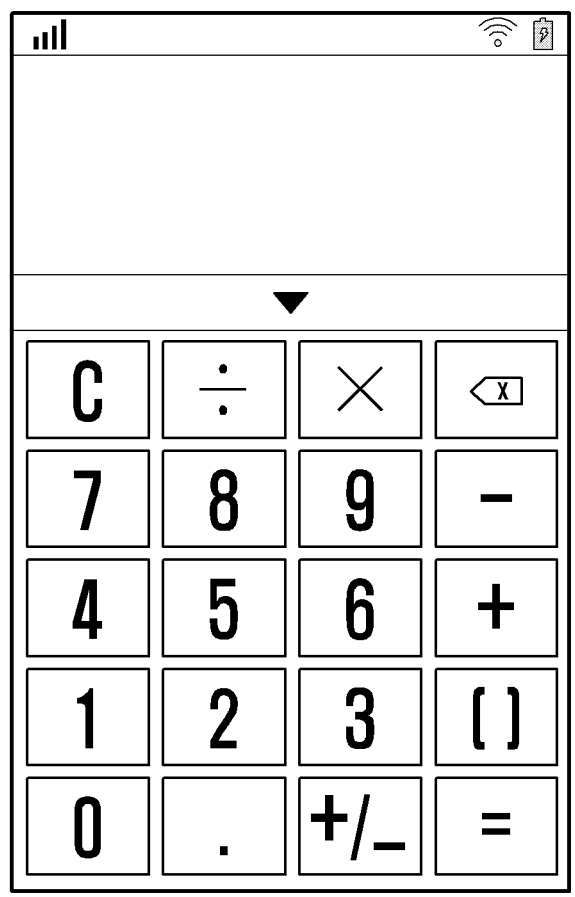
FIG. 2 illustrates a screen of a calculator application executed in isolation from a character input mode according to a related art technique.

Hereinafter, exemplary embodiments of the present technology are described in detail with reference to the accompanying drawings. The scope of the present technology is defined by the claimed subject matter in the "claims" section following this detailed description, and is in no way limited to the embodiments in the specification. Particular terms may be defined to describe the technology in the best manner without limiting the subject matter of the present technology. Accordingly, the meaning of specific terms or words used in the specification and the claims should not be limited to the literal or commonly employed sense, but should be construed in accordance with the spirit of the technology. The description of the various embodiments is to be construed as exemplary only and does not describe every possible instance of the technology. Therefore, it should be understood that various changes may be made and equivalents may be substituted for elements of the technology. In the drawings, some elements are exaggerated or only outlined in brief, and thus may be not drawn to scale. The present technology is not limited by relative sizes of objects and intervals between objects in the drawings.

In the description, a "character input mode" of an electronic device refers to a state in which any application requiring character input is active. "Characters" may include symbolic entities enterable to the electronic device such as letters, digits, symbols and emoticons. For example, the electronic device may enter the character input mode when the user executes one of various applications accepting characters, symbols and numbers, such as a text messaging application, instant messenger application, Social Networking Service (SNS) application, email application, or word processing application such as a memo application, household bookkeeping application, car bookkeeping application, and so forth. Such applications may include ones stored in the electronic device and ones executable in real-time through the Internet. However, a calculator application, which is an application dedicated exclusively or primarily for performing arithmetic calculations, is outside the realm of an application including a character input mode. That is, a "character input mode" is defined herein to exclude a numeral input mode of a calculator application.

A "character input window" refers to a window displayed on a display unit of the electronic device when the character input mode is activated. The character input window may include a touch input window acting as a character input keypad, and a display window displaying characters, symbols and numbers entered by the user through the touch input window. The touch input window may be implemented in various forms, as will be described in more detail later. Herein, a character input window does not refer to an input window of a calculator application.

An electronic device in accordance with the present technology can be, e.g., a smart phone, a tablet computer, a notebook computer, a word processing device, a personal digital assistant, a smart camera, or a display device integrated with a fixed appliance such as a kitchen appliance. In the description below, only components relevant to the present technology may be shown and described for brevity and to avoid obscuring the present technology.

FIG. 3 is a block diagram of an electronic device, 300, according to an embodiment of the present technology. Device 300 may include a communication unit 310, a key input unit 320, an audio processing unit 330, a display unit 340, a control unit 350, and a memory 360.

The communication unit 310 is configured to support communication for the electronic device 300. In the event that device 300 is configured only for a less complex, local-type application that does not require communication, the communication unit 310 may be omitted. The communication unit 310 may be activated according to a user request, and various key maps and control key maps displayed on the display unit 340 may be used to control the communication unit 310. The communication unit 310 may be composed of a mobile communication module supporting mobile communication. In this case, the communication unit 310 may establish a communication channel with a mobile communication system to send and receive signals for mobile communication of the electronic device 300. For example, the communication unit 310 may establish a communication channel with a mobile communication system for a voice call, video call or data call, and may send and receive corresponding signals. Such communication may be performed in accordance with any of a variety of protocols such as 3G, Long Term Evolution (LTE) and WiFi.

The key input unit 320 is configured to generate various input signals for operation of the electronic device 300. The key input unit 320 may include various input means such as a keyboard, keypad and key button according to design. When the display unit 340 has a touchscreen capability, the key input unit 320 may include physical keys independent of virtual keys output as touch maps. The key input unit 320 may include a specific key for initiating evaluation of an arithmetic expression output in the display window of the character input window.

The audio processing unit 330 may output audio data generated by playback of various audio files and audio data received from outside sources, during operation of the electronic device 300. The audio processing unit 330 may also collect audio data. To this end, the audio processing unit 330 may include a speaker (SPK) and a microphone (MIC). In particular, the audio processing unit 330 may output a sound effect or sound notification indicating detection of an arithmetic expression or output of a result of evaluation thereof.

For example, when the control unit 350 detects an arithmetic expression in the character input window, the audio processing unit 330 may output a sound notification indicating whether to evaluate the arithmetic expression. When the evaluation result is displayed in a pop-up window on the display unit 340 or when the arithmetic expression is replaced with the evaluation result in the character input window, the audio processing unit 330 may output a sound notification accordingly.

Upon reception of a key input requesting evaluation of an arithmetic expression output on the character input window, the audio processing unit 330 may output a corresponding sound effect. Output of such a sound effect or sound notification may be skipped according to user settings or design.

The display unit 340 is configured to output various interface screens needed for operation of the electronic device 300. For example, the display unit 340 may display an idle screen, a menu screen and a character input window in the character input mode. The display unit 340 may be configured to include a touch panel 343 and a display panel 341. To support a full touchscreen capability, the touch panel 343 may be formed so as to cover the display panel 341.

The display unit 340 may have a touchscreen capability based on the touch panel 343. In the present technology, the touch input window may take various forms by including one of various soft keyboards based on a 3*4 key map, 5*4 key map, QWERTY key map and Dvorak key map. Various screens or windows for the touch input window will be described in more detail later with reference to the accompanying drawings.

The memory 360 may include any of a variety of types of storage media such as flash memory type memory, hard disk type memory, multimedia card micro type memory, card type memory (e.g., SD or XD memory, etc.), RAM (random access memory), SRAM (static random access memory), ROM (read-only memory), EEPROM (electrically erasable programmable ROM), PROM (programmable ROM), magnetic memory, magnetic disk, optical disk, and the like. Memory 360 may store code for application programs (i.e., "applications") executable by the control unit 350, and the data generated by such applications. Such applications may include communication and word processing applications that perform arithmetic calculations as described in the methods herein.

The control unit 350 controls overall operation of the electronic device 300 and controls power supply to the internal components thereof. Control unit 350 includes at least one processor and executes application programs stored in the memory 360. In particular, the control unit 350 controls signal processing and delivery needed to evaluate an arithmetic expression displayed on the display window and to output the evaluation result on the display window. In the character input mode, the control unit 350 receives character input through the touch input window of the character input window and controls the display unit 340 to output the character input on the display window of the character input window.

The control unit 350 determines whether a preset calculation enabling condition has been satisfied. For example, in certain embodiments, when a specific key is repeatedly entered for a preset time, the control unit 350 may determine that the calculation enabling condition is satisfied.

The control unit 350 may also determine in some embodiments that the calculation enabling condition is satisfied when no input is entered through the touch input window of the character input window for a preset time or more. Other calculation enabling conditions may be defined by the user or manufacturer.

When the calculation enabling condition is satisfied, the control unit 350 checks whether an arithmetic expression is present in characters displayed in the display window of the character input window. When an arithmetic expression is present in characters displayed in the display window, the control unit 350 evaluates the arithmetic expression. For example, when characters including letters, digits and symbols are displayed in a text message composition window, the control unit 350 may find numbers and operator symbols among the displayed characters. When the found numbers and operator symbols (including '+', '−', '×', '÷' and '=') are arranged to form an arithmetic expression, the control unit 350 evaluates the arithmetic expression.

After evaluation of the arithmetic expression, the control unit 350 controls the display unit 340 to output the evaluation result on the display window of the character input window. The evaluation result may be output in various ways, as will be described in more detail later.

Figure 4A:
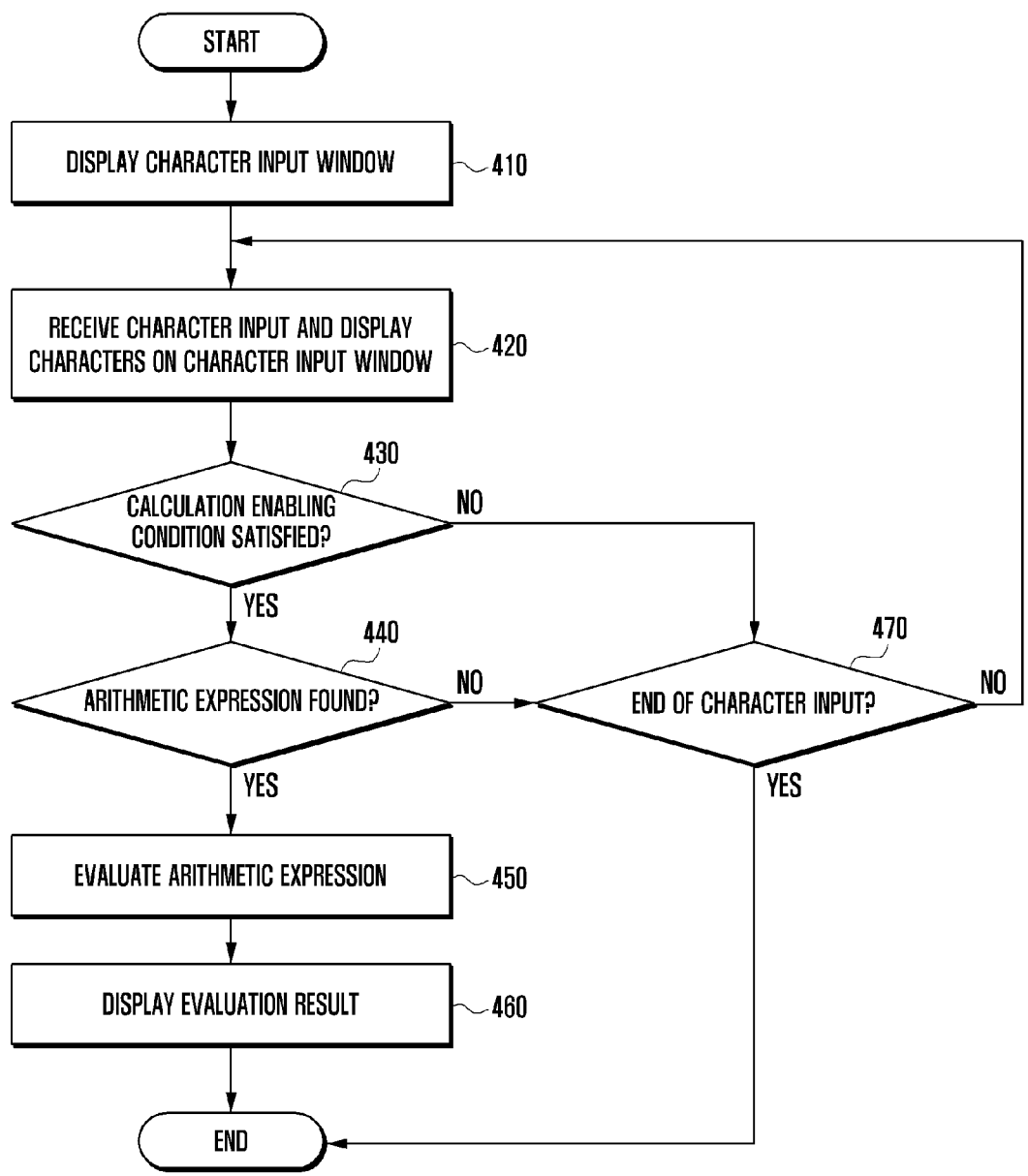
FIG. 4A is a flowchart of a method for performing calculations in a character input mode according to an embodiment of the present technology.
Figure 5:
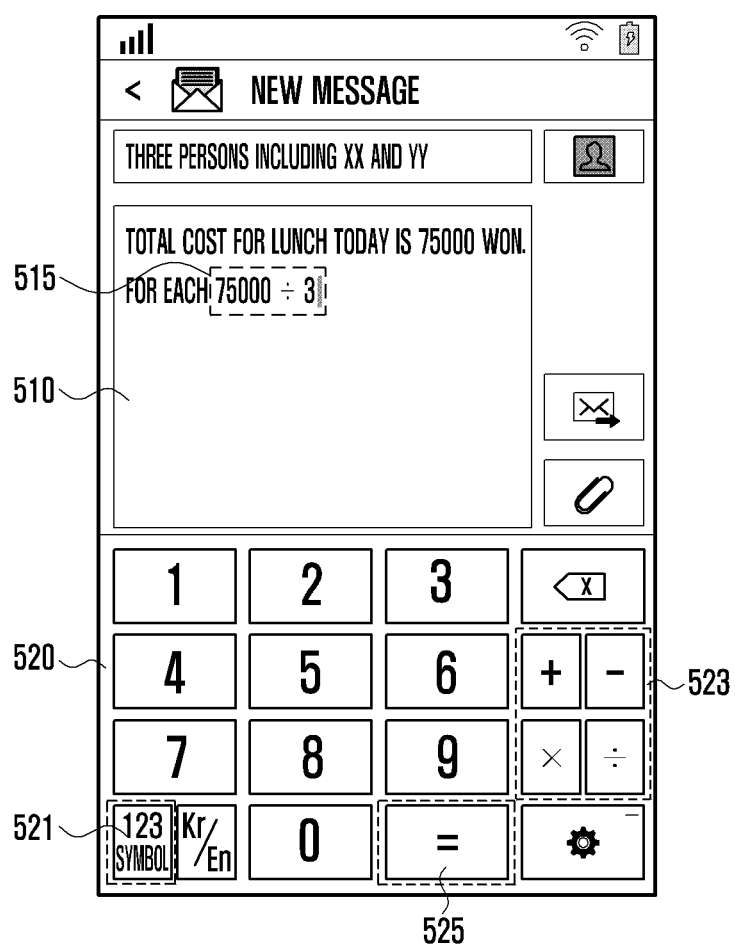
FIG. 5 is an example screen illustrating evaluation of an arithmetic expression in the character input mode using a first input keypad.
Figure 6:
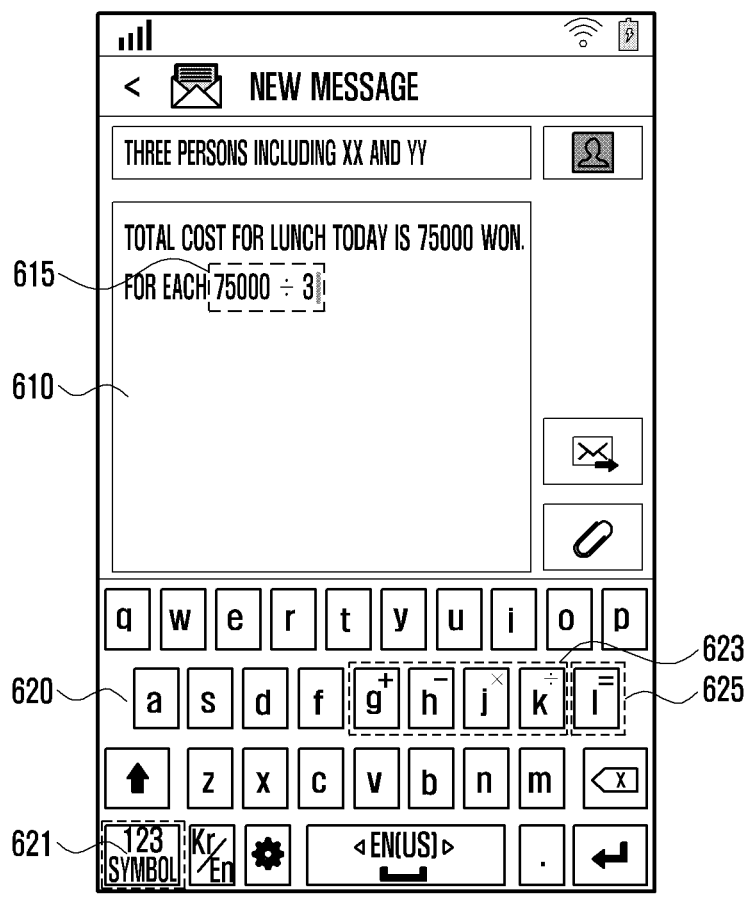
FIG. 6 is an example screen illustrating evaluation of an arithmetic expression in the character input mode using a second input keypad.
Figure 7:
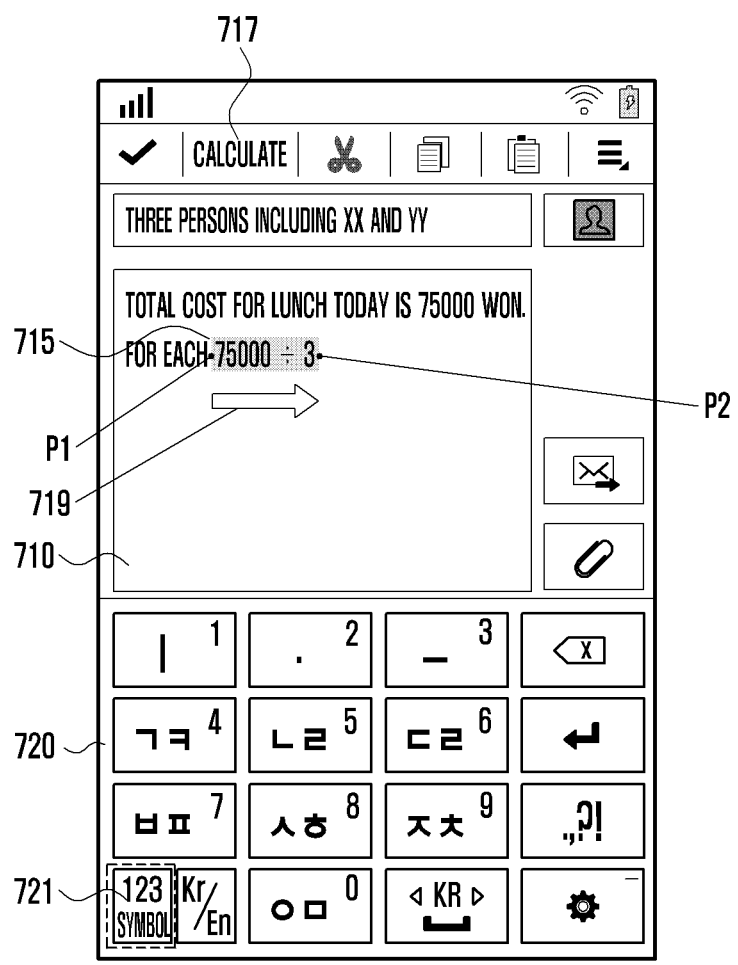
FIG. 7 illustrates selection of a portion of a message to be evaluated in an arithmetic expression entered in a character input window.

FIG. 4A is a flowchart of a method for performing calculations in a character input mode according to an embodiment of the present technology. FIGS. 5 and 6 are example screens which illustrate evaluation of an arithmetic expression in the character input mode using different touch input windows containing different input keypads. FIG. 7 is a screen illustrating selection of an arithmetic expression entered on the character input window in the character input mode, and FIG. 8 illustrates display of the evaluation result of the arithmetic expression.

Hereinafter, individual steps of the method shown in FIG. 4A will be described with reference to FIGS. 5 to 8.

Referring to FIG. 4A, the control unit 350 of the electronic device controls the display unit 340 to display a character input window in the character input mode (step 410). As described above, the character input mode refers to a state in which the electronic device executes an application requiring character input including letters, digits and symbols. The character input window is a screen output on the display unit 340 when such an application is executed.

Figure 8:
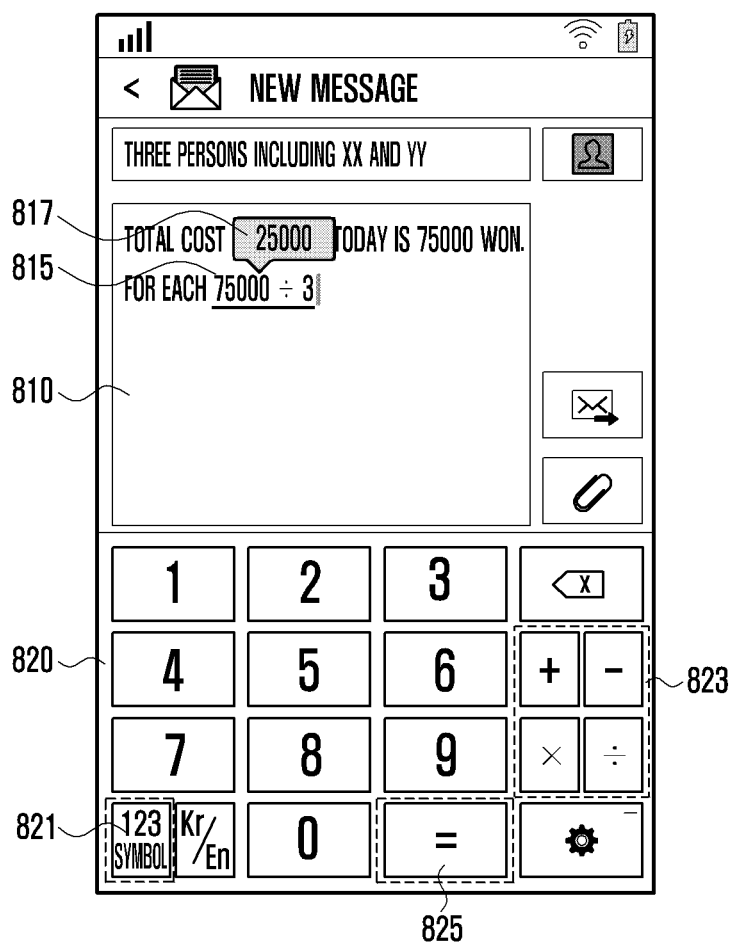
FIG. 8 illustrates display of the evaluation result of an arithmetic expression in the character input mode.

In FIGS. 5 to 8, the character input mode is activated by executing a text messaging application. A text message composition window is then used as a character input window on the display unit 340. As shown in FIG. 5, a character input window includes a display window 510 to display input characters such as letters, digits and symbols, and a touch input window 520 to enter characters. Other character input windows 610, 710, 810 and touch input windows 620, 720, 820 are shown in FIGS. 6-8. Dotted lines shown in FIGS. 5 to 8 are used only for description and are not actually displayed on the display unit 340.

The control unit 350 controls the display unit 340 to receive character input through the touch input window 520, 620, 720 or 820 of the character input window and to display character input on the display window 510, 610, 710 or 810 of the character input window (step 420).

Each display window 510, 610, 710 or 810 in FIGS. 5 to 8 displays characters including alphanumeric characters and operator symbols. These characters form a text message to be sent by the user to recipients. For example, the text message may notify the recipient that total cost for lunch (75000 won) is shared by the number of participants (3 persons). Here, numbers and an operator symbol form an arithmetic expression (75000÷3) to compute the cost per person. Of course, many other types of arithmetic expressions may be composed in text messages or word processing windows.

Referring to FIG. 5, the touch input window 520 is used to enter letters, digits and symbols supports a 3*4 key map. A switch key 521 and an operator section 523 may be used to enter characters such as letters, digits and symbols. Whenever the switch key 521 is entered, the control unit 350 may alternately output a number keypad and a symbol keypad (the number keypad is shown in FIG. 5; a QWERTY key map as a symbol keypad is shown in FIG. 6). The control unit 350 may control the display unit 340 to display input characters containing an arithmetic expression 515 on the display window 510.

Referring to FIG. 6, the touch input window 620 is used to enter letters, digits and symbols supports a QWERTY key map. A switch key 621 is used to switch the touch input window 620 between screens of different characters, and an operator section 623 may be used to enter characters such as letters, digits and symbols.

Here, the operator section 623 is composed of four keys each displaying two values 'g', 'h', 'j' or 'k' and '+', '−', '×', '÷', respectively. In this case, the control unit 350 may recognize an English letter when one of the four keys is entered once and recognize an arithmetic operator when one of the four keys is entered twice. (In this embodiment, suitable means are also included to allow the user to enter consecutive characters instead of the character followed by the operator. For instance, if the user desires to enter 'gg', but 'g+' appears instead, the application may be designed to automatically display 'gg' if the user enters the 'backspace' key within a predetermined time after 'g+' is displayed.) Whenever the switch key 621 is entered, the control unit 350 may alternately output a number keypad (as in FIG. 5) and a symbol keypad (as shown in FIG. 6). The control unit 350 may control the display unit 340 to display input characters containing an arithmetic expression 615 on the display window 610.

With continued reference to FIG. 4A, after displaying input characters on the display window 510, 610, 710 or 810 of the character input window, the control unit 350 determines whether a preset calculation enabling condition is satisfied (step 430). Here, the calculation enabling condition may correspond to a command for evaluating an identified arithmetic expression and may be set in advance by the user or manufacturer.

For example, when a preset key of the touch input window 520, 620, 720 or 820 or the key input unit 320 is entered, the control unit 350 may determine that the calculation enabling condition is satisfied. In the event that the preset key has a specific key value, the control unit 350 may determine that the calculation enabling condition is satisfied when the key is continuously entered (or pressed) for a preset time or more.

For example, referring to FIGS. 5, 6 and 8, user or manufacturer settings may direct the control unit 350 to determine that the calculation enabling condition is satisfied when the equal ('=') key 525, 625 or 825 is touched for a preset time or more.

The control unit 350 may also determine that the calculation enabling condition is satisfied when no input is entered for a preset time or more after displaying input characters on the display window 510, 610, 710 or 810. Other calculation enabling conditions may be defined by the user or manufacturer.

When the calculation enabling condition is satisfied, the control unit 350 checks whether an arithmetic expression is present in input characters displayed on the display window 510, 610, 710 or 810 (440). In FIG. 5 or 6, a dotted line is drawn around an arithmetic expression 515 or 615 for explanatory purposes herein but is not actually displayed on the display unit 340.

Specifically, when input characters including letters, digits and symbols are displayed on the display window 510, 610, 710 or 810, the control unit 350 may find numbers and operator symbols among the displayed characters. The control unit 350 may recognize the found numbers and operator symbols (including '+', '−', '×', '÷' and '='), which are arranged in a specific form, as an arithmetic expression. When an arithmetic expression is identified in the input characters, the control unit 350 evaluates the arithmetic expression (step 450).

Figure 4B:
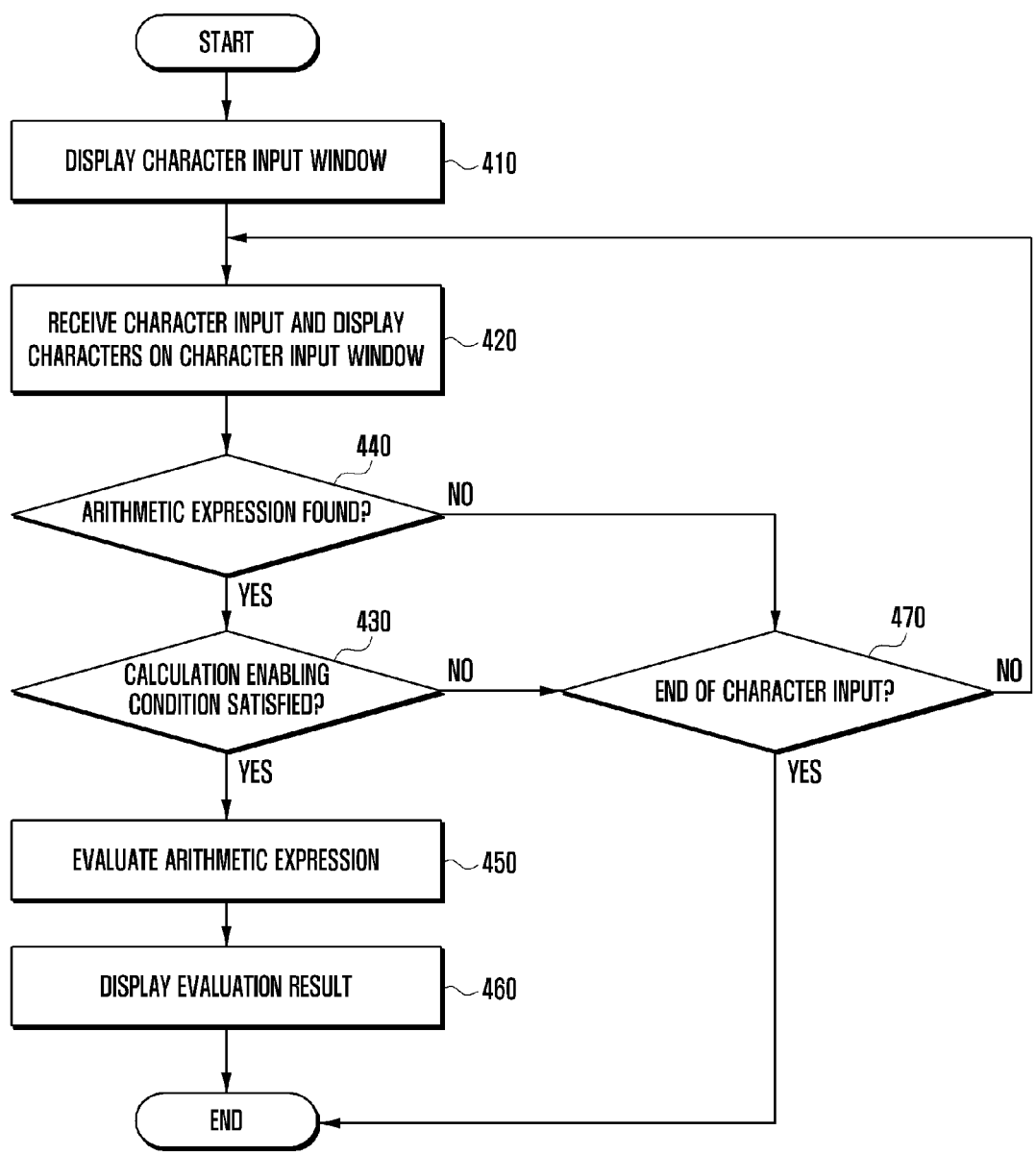
FIG. 4B is a flowchart of a method for performing calculations in a character input mode according to an embodiment of the present technology.

In the above-described operations, the determination of whether the calculation determination condition is satisfied, i.e., step 430, is performed just prior to the determination in step 440 as to whether an arithmetic expression is found. These steps may be reversed in an embodiment variation and FIG. 4B describes it.

FIG. 7 is a screen example illustrating an embodiment in which a dedicated calculation determination field or icon is displayed. FIG. 7 also illustrates an embodiment in which the control unit 350 may identify an arithmetic expression in input characters displayed on the display window 710 according to a touch gesture such as drag. The control unit 350 may examine whether the dragged-across portion forms an arithmetic expression. That is, the control unit 350 may determine whether numbers and operator symbols selected through dragging are arranged to form a calculable expression.

In FIG. 7, an arithmetic expression 715 is first identified, as described for step 440 above. When an arithmetic expression is identified, the control unit 350 may evaluate the arithmetic expression. The control unit 350 may initiate evaluation of the arithmetic expression 715 in response to user touch on a "calculate" command icon 717.

In this case, a touch input on the "calculate" command 717 may satisfy the calculation enabling condition. Consequently, in the embodiment of FIG. 7, the control unit 350 may perform step 440 for detecting an arithmetic expression indicated by dragging first and then perform step 430 for checking satisfaction of the calculation enabling condition. For instance, suppose the user touches the point P1 just to the left of expression 715 and drags the touch as indicated by the arrow 719 to the point P2 just right of expression 715. A process of determining an arithmetic expression can then be performed for the character sequence in-between the points P1 and P2. If an arithmetic expression is identified for those characters, the expression may be emphasized in a distinct manner, such as by highlighting or underlining.

In an alternative implementation, a touch detected on any displayed numeral or operand for at least a predefined time can be detected as an input to emphasize and optionally thereafter select a continuous character sequence encompassing the touch point. That is, an arithmetic expression may be selected by a touch and hold input, without the need for a drag. For instance, in FIG. 7, if a touch is detected on any part of '75000÷3', the entire sequence may be immediately analyzed and identified as an arithmetic expression. Once the arithmetic expression is identified, when an input is detected on the calculate icon 717, an evaluation result is determined and displayed.

Further, in still another embodiment, the control unit 350 may identify an arithmetic expression by finding numbers and operator symbols without receiving a touch gesture. In this case, expressions may be automatically emphasized as they are typed. Although an arithmetic expression is identified, when a portion of the identified arithmetic expression is selected by a touch gesture such as a drag between beginning and end points of just the desired portion of the expression, the control unit 350 may evaluate only the selected portion if the selected portion forms a calculable expression.

The control unit 350 controls the display unit 340 to display the result of evaluation of the arithmetic expression 515, 615, 715 or 815 (step 460).

Referring to FIG. 8, when an arithmetic expression 815 is identified, whether via predetermined touch input or automatically, depending on the implemented embodiment, the control unit 350 controls the display unit 340 to display the arithmetic expression 815 in a distinct manner. For example, the control unit 350 may control the display unit 340 to place an underline under the arithmetic expression 815, to highlight it, or display it in a different font or color than the other displayed characters. Thereby, the electronic device may notify the user of detection of an arithmetic expression and the user may judge whether an arithmetic expression has been suitably selected.

In one embodiment, if the equal ('=') key 825 is held for a preset time, the calculation enabling condition is satisfied and the control unit 350 may control the display unit 340 to replace the identified arithmetic expression with the evaluation result on the display window 810. For example, in FIG. 8, the arithmetic expression ("75000÷3") may be replaced with the evaluation result ("25000") on the display window 810.

In yet another embodiment, the control unit 350 may control the display unit 340 to replace an identified arithmetic expression with the arithmetic expression plus the evaluation result on the display window 810. For example, in FIG. 8, the arithmetic expression ("75000÷3") may be replaced with the arithmetic expression plus the evaluation result ("75000÷3=25000") on the display window 810.

In still another embodiment, the control unit 350 may control the display unit 340 to display a pop-up window containing the evaluation result close to the identified arithmetic expression on the display window 810. For example, in FIG. 8, a pop-up window 817 containing the evaluation result ("25000") may be displayed close to the arithmetic expression ("75000÷3") on the display window 810. In addition, when a touch is input on the pop-up window 817, the control unit 350 may control the display unit 340 to replace the arithmetic expression with the evaluation result on the display window 810 or to replace the arithmetic expression with the arithmetic expression plus the evaluation result.

It should be noted, in a variation of the embodiment illustrated in FIG. 8, the control unit 350 can be configured to identify arithmetic expressions "on the fly" as the user is typing, and as soon as an arithmetic expression is so identified, the pop-up window 817 can be displayed with an evaluation result, even if the user has not completed inputting the arithmetic expression. As the user continues to type, the displayed evaluation result in the pop-up window will change accordingly, and the user has the option of selecting the result at any time. In this case, the calculation enabling condition is essentially the identification of the arithmetic expression in the first place. Hence it can be assumed that step 430 is a part of step 440 in this scenario (i.e., step 430 is omitted).

With continuing reference to FIG. 4A, when the calculation enabling condition is not satisfied at step 430 or an arithmetic expression is not detected at step 440, the control unit 350 checks whether character input through the touch input window 520, 620, 720 or 820 is ended (step 470). When character input does not occur for a preset time, the control unit 350 may regard this as the end of character input and terminate the character input mode. Here, in response to an input "send" command, the control unit 350 may transmit a text message including the input characters displayed on the display window 510, 610, 710 or 810 through the communication unit 310, or store the same if no send command is input.

When a character is input through the touch input window 520, 620, 720 or 820, the control unit 350 returns to step 420 and continues the procedure.

Figure 9A:
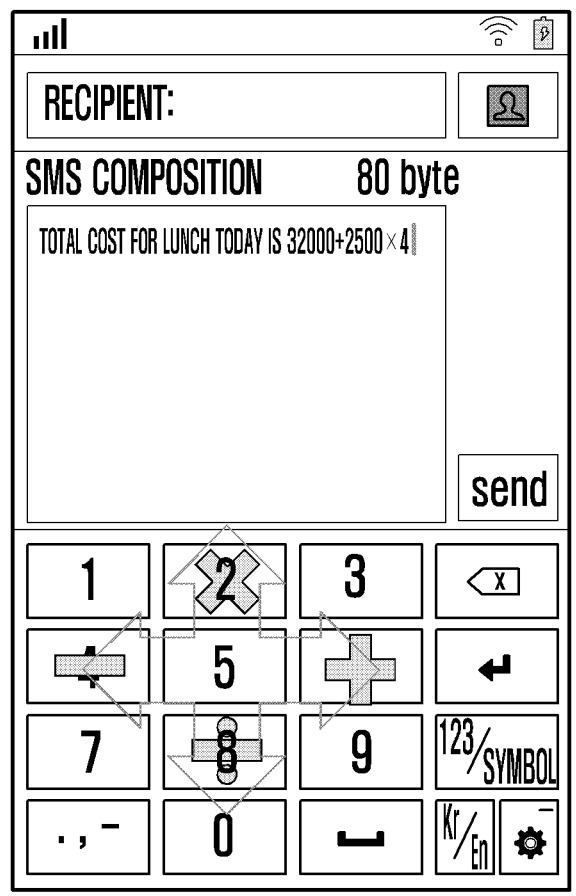
FIG. 9A and FIG. 9B illustrate evaluation of an arithmetic expression in the character input mode without switching between input keypads.
Figure 9B:
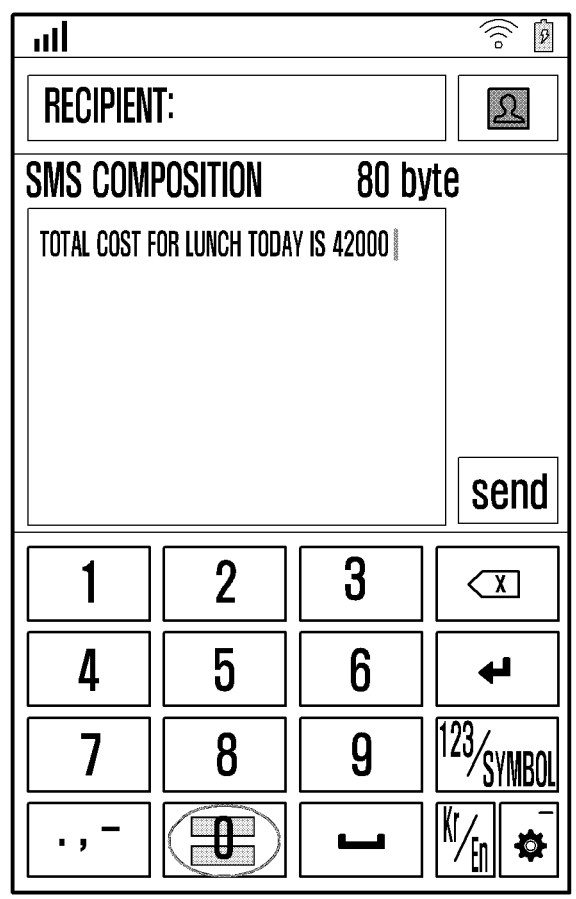

FIGS. 9A and 9B are screen examples that illustrate an embodiment in which evaluation of an arithmetic expression is made in the character input mode without switching between input keypad screens.

Referring to FIG. 9A, after a first number is entered on the display window of the character input window, when a numeric key of the touch input window is continuously entered (touched) for a preset time or more, the control unit 350 assigns operator symbols to some numeric keys around the continuously touched numeric key. As illustrated, the operator symbols are displayed superimposed with the numerals associated with the respective numeric keys. The touched numeric key may be a central key pre-designated for this purpose, such as the '5' key. Alternatively, the operator symbols are designed to appear whenever any numeric key if touched for at least the preset time.

Thereafter, when a drag gesture is entered from the continuously touched numeric key toward a numeric key having a superimposed assigned operator symbol, the control unit 350 outputs the assigned operator symbol on the display window. (Drag gestures are illustrated in FIG. 9A with arrows pointing away from the '5' key.) The control unit 350 receives a second number and displays the same on the display window. In this way, the control unit 350 may form a complete arithmetic expression and display the arithmetic expression on the display window of the character input window.

For example, when the numeric key '5' is continuously touched for a preset time or more, the control unit 350 may assign operator symbols '×', '÷', '−' and '+' to the numeric keys '2', '8', '4' and '6' around the numeric key '5'. The control unit 350 controls an operation to receive a number "32000" via conventional taps on the respective numeric keys, and output the number on the display unit 340. When the numeric key '5' is continuously touched for a preset time or more, the control unit 350 assigns operator symbols to the numeric keys around the numeric key '5' as shown in FIG. 9A. When a drag gesture is entered from the numeric key '5' to the numeric key '6', the control unit 350 controls the display unit 340 to output the operator symbol '+' on the display window.

When the drag gesture is released, the numeric keys with assigned operator symbols operate as normal numeric keys without operator symbol assignment. Thereafter, the control unit 350 controls an operation to receive a number "2500" and output the number on the display unit 340.

Next, in the example of FIG. 9A, when the numeric key '5' is again held down for at least the preset time and a drag gesture is entered from the numeric key '5' to the numeric key '2', the control unit 350 controls the display unit 340 to output the operator symbol '×' on the display window. In this manner, an arithmetic expression "32000+2500×4" is entered and displayed on the display window of the character input window as shown in FIG. 9A.

With the characters and arithmetic expression thus displayed on the display window as shown in FIG. 9A, an exemplary calculation enabling condition is detected through an operation illustrated in FIG. 9B. That is, when a preset key is continuously entered for a preset time, the control unit 350 may determine that the calculation enabling condition is satisfied. For example, when the numeric key '0' is continuously entered for a preset time, the control unit 350 may assign the equal symbol '=' to the numeric key '0' and display a superimposed '=' symbol with that key as illustrated. (It is noted, to ensure the user is aware of the preceding operation, a prompt such as "press and hold 0 key to obtain arithmetic result" may be displayed in the text window directly above the keypad.) Here, the equal symbol '=' may correspond to a key value '=' or to the calculation enabling condition. That is, when the numeric key '0' is continuously entered for a preset time, the control unit 350 determines that the calculation enabling condition is satisfied for an arithmetic expression displayed on the display window. The control unit 350 identifies the arithmetic expression "32000+2500×4" in the input characters on the display window and checks whether the identified arithmetic expression is a valid or calculable expression. When the arithmetic expression is calculable, the control unit 350 evaluates the arithmetic expression and displays the evaluation result.

In FIG. 9B, the control unit 350 controls the display unit 340 to replace the arithmetic expression "32000+2500×4" with the evaluation result "42000" on the display window. As described before, the arithmetic expression and the evaluation result thereof may be presented in various ways. For example, only the evaluation result may be displayed through replacement; both the arithmetic expression and evaluation result may be displayed through concatenation using the equal symbol '='; or the evaluation result may be displayed on a separate pop-up window which can then be selected.

Meanwhile, the control unit 350 may control the display unit 340 to output a separate pop-up window containing operator symbols as an overlay on the numeric touch input window.

In a feature of the present technology, the method and apparatus for performing calculations in a character input mode of an electronic device enable the user to evaluate arithmetic expressions in the character input mode without using a separate calculator application or performing screen transition. In addition, an arithmetic expression entered in a character input window in the character input mode can be directly evaluated and the evaluation result can be used in various ways, thereby enhancing user convenience.

The above-described exemplary embodiments according to the present technology can be implemented in hardware, firmware or via the execution of software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

While the present technology has been particularly shown and described with reference to exemplary embodiments thereof, it will be understood by those of ordinary skill in the art that various changes in form and details may be made therein without departing from the spirit and scope of the invention as defined by the following claims.

What is claimed is:

1. A method for performing calculations in a character input mode of an electronic device, comprising:
   receiving character input in the character input mode and displaying input characters in a character input window;
   determining whether a preset calculation enabling condition is satisfied;
   checking whether an arithmetic expression is present in the displayed input characters;
   evaluating the arithmetic expression when the preset calculation enabling condition is satisfied; and
   displaying a result of the evaluation.

2. The method of claim 1, wherein the calculation enabling condition is satisfied when a given key of the character input window is continuously touched for a preset time or more.

3. The method of claim 1, wherein checking whether an arithmetic expression is present comprises determining whether a portion of the displayed input characters selected by a drag gesture is an arithmetic expression.

4. The method of claim 1, wherein evaluating the arithmetic expression further comprises presenting the arithmetic expression in a manner distinct from the remaining portion of the displayed input characters.

5. The method of claim 1, wherein displaying the evaluation result comprises replacing the arithmetic expression with the evaluation result.

6. The method of claim 1, wherein displaying the evaluation result comprises displaying a pop-up window containing the evaluation result close to the arithmetic expression.

7. The method of claim 6, wherein displaying the evaluation result further comprises replacing, when the pop-up window is touched, the arithmetic expression with the evaluation result.

8. The method of claim 1, wherein the characters comprise letters, operand symbols and digits.

9. An apparatus for performing calculations in a character input mode of a electronic device, comprising:
   a display unit displaying input characters in a character input window in the character input mode; and
   a control unit determining whether a preset calculation enabling condition is satisfied, checking whether an arithmetic expression is present in the displayed input characters, evaluating the arithmetic expression when the preset calculation enabling condition is satisfied, and controlling the display unit to display a result of the evaluation.

10. The apparatus of claim 9, wherein the control unit determines that the calculation enabling condition is satisfied when a given key of the character input window is continuously touched for a preset time or more.

11. The apparatus of claim 9, wherein the control unit determines a portion of the displayed input characters selected by a drag gesture as the arithmetic expression.

12. The apparatus of claim 9, wherein the control unit controls the display unit to present the identified arithmetic expression in a manner distinct from the remaining portion of the displayed input characters.

13. The apparatus of claim 9, wherein the control unit controls the display unit to replace the arithmetic expression with the evaluation result on the character input window.

14. The apparatus of claim 9, wherein the control unit controls the display unit to display a pop-up window containing the evaluation result close to the arithmetic expression.

15. The apparatus of claim 14, wherein, when the pop-up window is touched, the control unit controls the display unit to replace the arithmetic expression with the evaluation result on the character input window.

16. A method for performing calculations in a character input mode of an electronic device, comprising:
   receiving character input in the character input mode and displaying input characters in a character input window; and
   identifying whether an arithmetic expression is present in the displayed input characters, if so, evaluating the arithmetic expression and displaying a result of the evaluation.

17. The method of claim 16, wherein the evaluation result is displayed as in a pop-up window in proximity to the arithmetic expression.

18. The method of claim 17, further comprising detecting a touch input on the pop-up window, and replacing the arithmetic expression with the evaluation result in response to the detection.

* * * * *